June 22, 1954 W. R. ELKINS 2,681,509

DEVICE FOR THE MEASUREMENT OF IRREGULAR AREAS

Filed Nov. 25, 1952 2 Sheets-Sheet 1

INVENTOR

William R. Elkins

June 22, 1954    W. R. ELKINS    2,681,509
DEVICE FOR THE MEASUREMENT OF IRREGULAR AREAS
Filed Nov. 25, 1952    2 Sheets-Sheet 2

INVENTOR

William R. Elkins

Patented June 22, 1954

2,681,509

UNITED STATES PATENT OFFICE 2,681,509

DEVICE FOR THE MEASUREMENT OF IRREGULAR AREAS

William R. Elkins, Port Wentworth, Ga.

Application November 25, 1952, Serial No. 322,529

9 Claims. (Cl. 33—121)

The present invention relates to devices for the measurement of irregular areas, and more particularly to devices of this character which are suitable for visual observation of the area to be measured, the area ordinarily being in a vertical plane with a straight horizontal base line.

Among the objects of the invention is the provision of a device of this character comprising a flat transparent window through which the area to be measured is viewed, an eyepiece for viewing the area through the window, and a plurality of equally spaced movable slide members each comprising a visible index portion displaceable in a plane adjacent to the plane of said window and parallel thereto, together with totalizing means for measuring the aggregate movement of the several slide members.

A further object of the invention is the provision of a device of this character which includes manually operable means for moving the slide members individually, in order that the index portions of the slide members may be individually positioned to conform to the irregular peripheral contour of the area to be measured as observed through the eyepiece and the window.

Another object of the invention is to provide a measuring device of this character in which a variable resistor is mechanically coupled to each slide member and in which the totalizing means includes an electrical measuring device responsive to the total aggregate resistance of all of the variable resistors.

Still another object of the invention is the provision of an area measuring device of this character in which all of the variable resistors are connected in series, and in which the electrical measuring device is a resistance measuring device connected in the circuit of the serially connected variable resistors for the measurement of the sum of the resistances thereof.

In another embodiment, the invention comprises a frictionally engageable surface on each slide member, and the totalizing means comprises a manually rotatable wheel individually selectively engageable with each frictional surface for moving the slide member, together with indicating means responsive to the total amount of rotation of the wheel.

Another object of the invention is the provision of a measuring device of this character which includes a hood member extending between the eyepiece and the window for excluding stray light from the optical path between the window and the eyepiece.

Still another object of the invention resides in the provision of a window comprising two parallel spaced sheets of transparent material, the index portion of each slide member being movable in the space between the transparent sheets.

Other and further objects will become apparent upon reading the following specification together with the accompanying drawing forming a part hereof.

Referring to the drawing.

Figure 1:
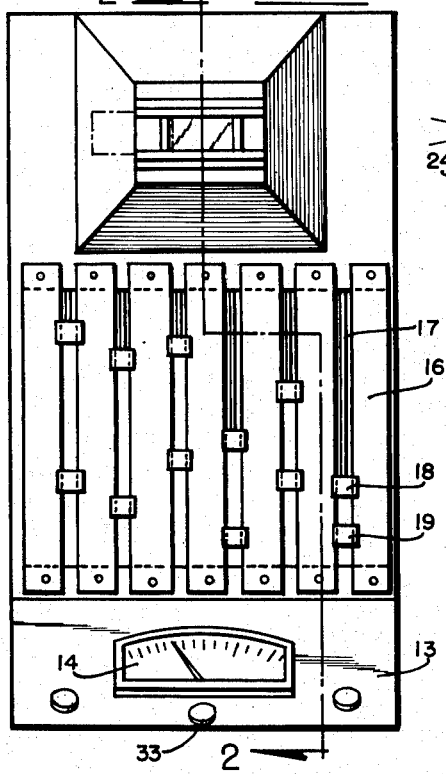
Fig. 1 is a front elevational view of an embodiment of the invention.
Figure 2:
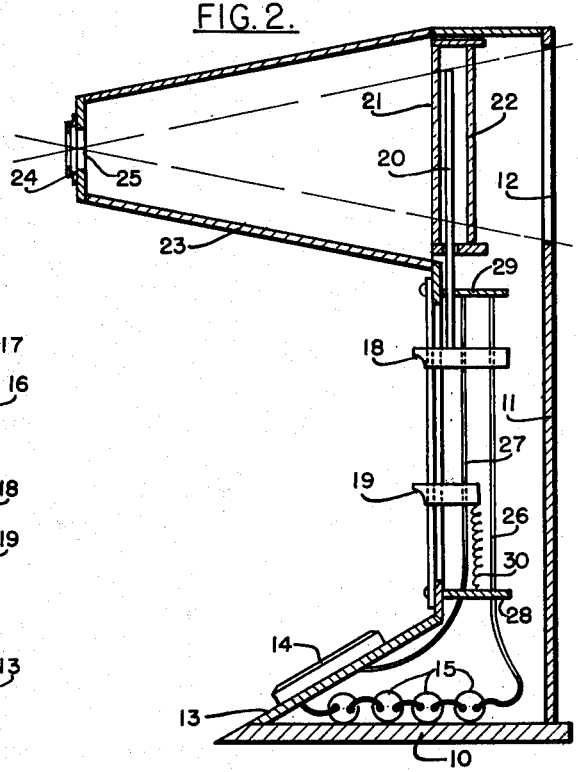
Fig. 2 is a sectional view in elevation taken along the line 2—2 of Fig. 1.

Referring to Fig. 1, the device comprises a base member 10 from which a rear wall 11 extends upwardly, the rear wall 11 being provided with an aperture 12 near its top for viewing therethrough. A sloping instrument panel 13 extends upwardly and rearwardly from the base member and supports an electrical resistance measuring instrument or ohmmeter 14 which is connected in an electrical circuit including the dry cells 15, as described in greater detail below.

Mounted on the front of the device are a plurality of uniformly spaced vertically extending wall members 16 with slots 17 therebetween. Movably disposed in the slots 17 are a plurality of slide members comprising an upper limiting slide member 18 and a lower measuring slide member 19.

Extending upwardly from each limiting slide member 18 is a rod 20. Each rod 20 extends between the two front and rear panes 21 and 22, respectively, of a window which is disposed in alignment with the aperture 12 at the upper portion of the rear wall 11 of the device. The spaced window panes 21 and 22 are parallel to each other and to the rear wall 11 and are formed of sheets of suitable transparent material, such as glass, for example. A suitable transparent plastic may be used if desired.

By movement of measuring slide members 19 and the limiting slide members 18, the heights of the rods 20 within the window 21—22 may be adjusted as desired.

Extending forwardly from the window 21—22 is a hood or light shield 23 shaped in the form of a hollow truncated pyramid with an eyepiece 24 disposed in alignment with an aperture 25 at the front end of the hood 23. The eyepiece 24 is thus located at a predetermined fixed distance from the window 21—22.

Disposed behind the uniformly spaced vertical slots 17, are pairs of wires 26—27 which extend between spaced insulating members 28 and 29. The rear wire 26 is of copper or other material of high electrical conductivity and the front wire 27 is formed of resistance wire. Each of upper limiting slide members 18 engages both wires 26 and 27 and may be moved vertically to determine the maximum resistance which may be introduced into the measuring circuit, the greatest permissible resistance being available when the upper limiting slide member is moved to its extreme upper limit of travel at the top of slot 17.

Figure 3:
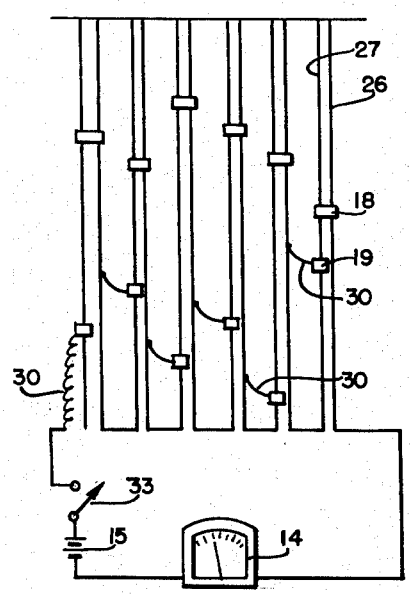
Fig. 3 is an electrical circuit diagram of the device shown in Fig. 1.

Each of the measuring slide members is movable along the resistance wire 27 and includes a contact for engagement with the resistance wire 27. A flexible conductor 30 connects each of the movable contacts of the measuring slide members 19 to the next circuit, so that the resistance wires 27 are connected in series as shown in Fig. 3, an adjustable portion of each resistance wire 27 being included in the series circuit as determined by the positions of its associated measuring and limiting slide members 19 and 18.

In operation, assume for example that it is desired to determine the volume of a pile of cordwood. The individual sticks of cordwood are of uniform length so that the volume may be determined by measurement of the area of the pile viewed endwise with respect to the sticks and multiplying this area by the stick length in order to obtain the volume.

Figure 4:
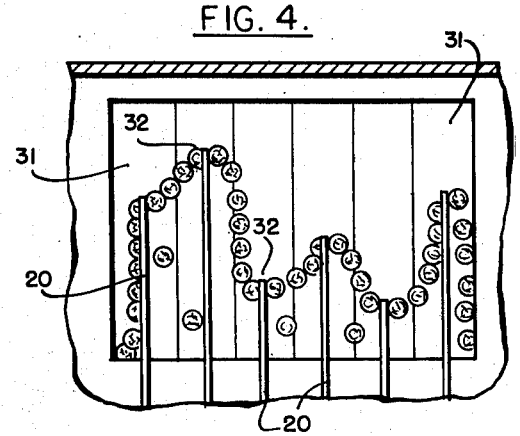
Fig. 4 is a detail view of the window showing how the device is used.
Figure 5:
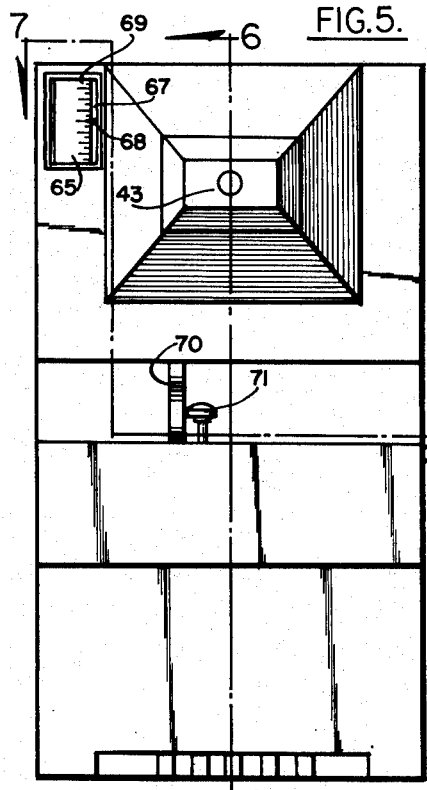
Fig. 5 is a front view in elevation of a modified form of the invention.
Figure 6:
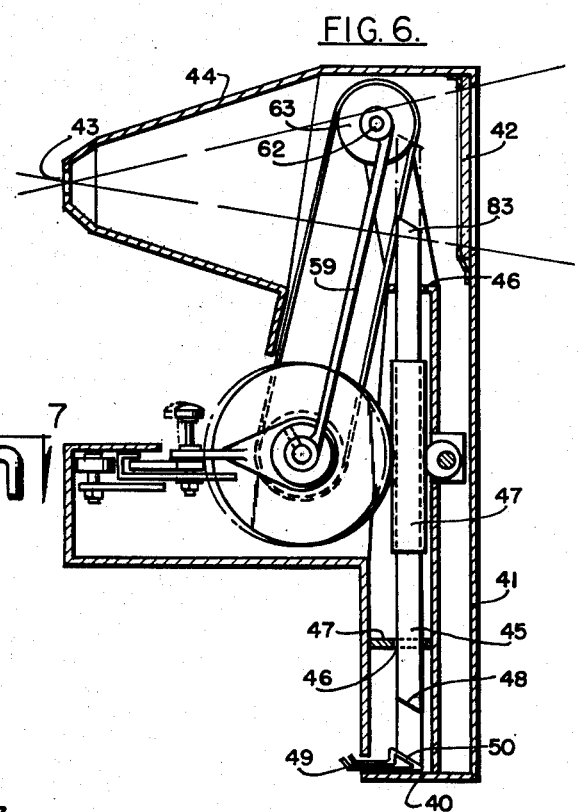
Fig. 6 is a sectional view in elevation taken along the line 2—2 of Fig. 5, looking in the direction of the arrows.

The measuring device is located at a predetermined measured distance from the pile of wood, which will then appear in the window generally as illustrated in Fig. 4. This measured distance is determinative of a multiplying factor by which the actual area may be computed in any desired units of measurement. The window 21—22 is divided by vertical lines into a plurality of strips 31 of equal widths, as shown in Fig. 4. Vertically movable in the center of each strip is one of the rods 20. The measuring slide members are first positioned near the bottoms of the slots 17, and the limiting slides 18 with their attached rods 20 are moved down in contact with them. Each measuring slide 19 is then raised, lifting the limiting slide above it and its rod 20 until the upper ends 32 of the rods 20 are all even with the bottom of the pile of wood, which, in the example shown in Fig. 4, is a horizontal straight line. The switch or push button 33 in the circuit of ohmmeter 14 is then closed and ohmmeter 14 is adjusted by any convenient and well known means to give a reading of zero with the rods 20 in this initial position. The rods 20 are then moved upwardly by means of upper limit slide members 18, so that they are positioned with their upper ends 32 even with the top of the pile of wood as it appears in each of the inidividual strips 31, as shown in Fig. 4. Switch or push button 33 is then closed again and the reading of ohmmeter 14 is noted and recorded. The reading of ohmmeter 14 will be proportional to the amount of resistance which was introduced in the ohmmeter circuit by movement of the limiting slide members 18 upwardly to bring the upper ends 32 of rods 20 into the position shown in Fig. 4 from the initial position. This resistance reading is directly proportional to the sum of the areas measured in each of the individual strips 31 of window 21—22, and hence to the total area of the ends of the pile of wood. By means of a suitable known conversion factor this resistance reading may be converted into the desired measurement expressed in units of area. If desired, the scale of the ohmmeter 14 may be calibrated directly in units of area, or if the sticks of wood are always of the same length, directly in units of volume.

Referring now to the embodiment of the invention shown in Figs. 5 to 8, the device comprises a base 40 from which a rear wall 41 extends upwardly, a window 42 being provided at the upper portion of rear wall 41. An eyepiece 43 is spaced at a fixed predetermined distance from the window 42 by a hood or light shield 44, and the window 42 may be observed through the eyepiece 43.

A plurality of equally spaced vertically movable slide members 45 pass freely through apertures 46 in transverse frame members 47. Centrally disposed on each of the slide members 45 is a resilient covering 47 of rubber or similar material for moving each slide member by frictional engagement with the resilient covering 47, or for holding the slide members in any desired position of adjustment by frictional engagement with the resilient covering.

The lower end of each slide member 45 is tapered at 48, and the lowermost position of each slide member 45 is adjustable by horizontal movement of a zero adjustment member 49 having a sloping upper surface 50 which engages the tapered lower end of the slide member 45 at 48.

A horizontal shaft 51 is journaled at 52 and passes through a friction bearing at 53 which opposes rotation of the shaft 51. Shaft 51 extends to the exterior of the device where it is bent to provide an operating handle 54. A plurality of eccentric cam members 55 are fixed to shaft 51 for rotation therewith and may be simultaneously brought into engagement with the rear frictional surfaces of the resilient coverings 47 in order to retain the slide members 45 in various desired vertical positions of adjustment. By rotation of shaft 51, using the operating handle 54, the eccentric cam members 55 may be turned to disengage the resilient coverings 47 of the slide members 45 and thereby allow them to drop to their lowermost positions determined by the zero adjustment members 49.

A horizontal shaft 56 has a collar 57 splined thereto and freely movable longitudinally therealong. Shaft 56 is journaled at 58 in a frame 59 whose upper end is pivoted to the main supporting frame of the device at 60 and 61, the pivotal connection at 61 comprising a shaft 62 which carries an idler sprocket wheel 63 freely rotatably mounted thereon. At one end, the spline shaft 56 has a driven sprocket wheel 64 fixed thereto for rotation therewith. An endless belt or tape 65 having sprocket holes 66 along its sides passes over idler sprocket wheel 63 and driven sprocket wheel 64 and carries a measuring scale comprising indicia 67 marked thereon. The measuring scale 67 may be read by reference to a fixed index pointer 68 in conjunction with a portion of the belt or tape 65 which is visible through a window 69 provided in the housing of the device for this purpose.

Fixed to collar 57 for rotation therewith is a friction wheel 70 which may be manually pressed into individual frictional engagement with each of the resilient covers 47 of the slide members 45 by a handle 71 for raising each slide member successively in the course of a measurement. Handle 71 is carried by a lever 72 which is connected to a circumferential groove in collar 57, collar 57 being freely rotatable with respect to lever 72.

Figure 7:
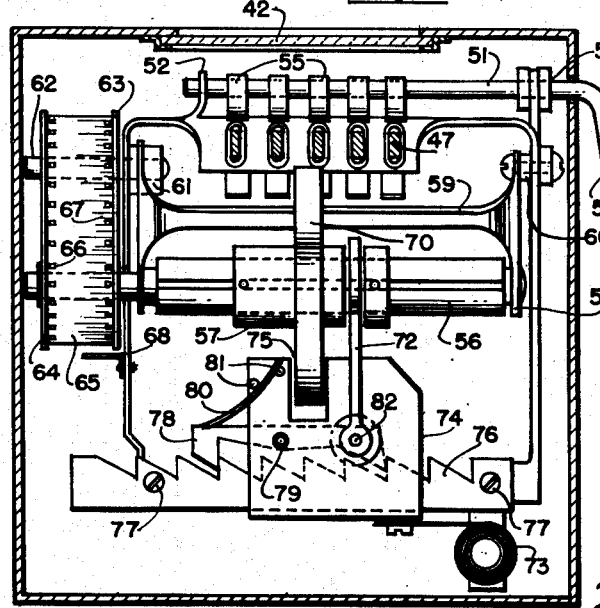
Fig. 7 is a plan sectional view taken along the line 7—7 of Fig. 6.

A clock spring 73 has a free end connected to a laterally movable carriage 74 and urges this carriage to the right as seen in Fig. 7. The carriage 74 is provided with a notch 75 which engages the sides of the friction wheel 70 for moving it longitudinally along the spline shaft 56.

A serrated rack 76 is fixed to the frame of the device by screws 77. An escapement dog 78 having contact points spaced apart three and one-half times the pitch of serrated rack 76 is pivoted to carriage 74 at 79 and is pressed by a flat leaf spring 80 disposed between two pins 81, the spring 80 urging escapement dog 78 in a counterclockwise direction as viewed in Fig. 7. The spacing between adjacent teeth of the rack 76 is equal to the spacing between the slide members 45, so that actuation of the escapement dog 78 permits clock spring 73 to advance the carriage 74 to move friction wheel 70 from engagement with one of the slide members 45 into engagement with the adjacent slide member immediately to its right as shown in Fig. 7.

The escapement dog 78 is pivotally connected to the handle 71 at 82, so that each time the handle 71 is drawn toward the operator of the device, the friction wheel 70 is withdrawn from engagement with the resilient cover 47 of one of the slide members and the escapement dog 78 is actuated at the same time. Upon actuation of escapement dog 78, the point of escapement dog that has been in contact with tooth of serrated rack 76 is released and carriage 74 is advanced, under the influence of clock spring 73, one-half the pitch of serrated rack. Upon release of handle 71 spring 80 urges escapement dog in counterclockwise direction until contact point of dog 78 next to pivoted point 82 is released from engagement with tooth of serrated rack 76. Carriage 74 moving the friction wheel 70 and collar 57 is now allowed to advance the remaining one-half pitch of serrated rack to bring friction wheel 70 into position for engagement with the resilient cover 47 of the next slide member 45.

Figure 8:
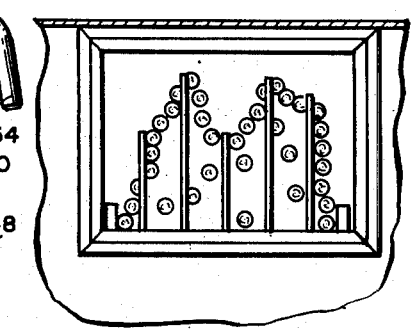
Fig. 8 is a detail view of the window of the device shown in Fig. 6, illustrating how the device is used.

In operation, the lever 54 is actuated to turn the eccentric cam members 55 so that the slide members 45 are freely vertically movable. Friction wheel 70 is turned to bring the zero of scale 67 into alignment with index 68. The zero adjustment members 49 are then positioned so that the upper ends 83 of the slide members 45 are positioned along the bottom of a pile of wood, for example, as viewed in eyepiece 43 through window 42, as described above. The operating handle 54 is then turned to reengage the eccentric cam members 55 with the resilient covers 47 of the slide members 45 so that they will remain in any desired position of vertical adjustment. The handle 71 is then moved to its extreme left position and friction roll 70 is turned to bring the upper end 83 of the first slide member 45 into alignment with the top of the pile of wood as it appears in that portion of the window 42 directly behind the slide member 45. This rotation of friction wheel 70 also causes rotation of spline shaft 56 and driven sprocket 64, the amount of rotation being in accordance with the height of this particular vertical portion of the pile. The handle 71 is then pulled toward the operator, causing the friction wheel 70 to advance for engagement with the next slide member 45. When all of the slides have been positioned as indicated in Fig. 8, then the total displacement of scale 67 past index 68 will be a measure of the tool area observed.

As in the case of the ohmmeter, the scale 67 may be directly calibrated in units of area or of volume.

It will be understood that many changes may be made in the details of construction of the device without departing from the scope of the invention as defined in the appended claims.

What is claimed is:

1. An area measuring device of the class described, comprising: a flat transparent window; an eyepiece for viewing said window spaced therefrom at a fixed predetermined distance; a plurality of equally spaced longitudinally movable slide members each comprising a visible index portion displaceable in a plane adjacent to and parallel to said window; and totalizing means responsive to the total aggregate movement of said plurality of slide members.

2. An area measuring device according to claim 1, further comprising manually operable means for individually moving said slide members, whereby said index portions of said slide members may be positioned in accordance with the peripheral contour of the area to be measured.

3. An area measuring device according to claim 1, further comprising a variable resistor mechanically coupled to each slide member and comprising a portion movable with said slide member, wherein said totalizing means comprises electrical measuring means responsive to the total aggregate resistance of said plurality of variable resistors.

4. An area measuring device according to claim 3, wherein said variable resistors are connected in series, and wherein said electrical measuring means consists of resistance measuring means responsive to the total resistance of said serially connected variable resistors.

5. A measuring device according to claim 1 where each slide member comprises a frictionally engageable surface, and wherein said totalizing means comprises a manually rotatable wheel member individually selectively engageable with each frictional surface and indicating means responsive to the total rotation of said wheel member.

6. A measuring device according to claim 5 further comprising a laterally movable carriage for moving said wheel into successive engagement with said slide member; spring means acting on said carriage to cause lateral movement thereof; a serrated rack; and an escapement dog carried by said carriage and engaging said rack and operable to permit the movement of said carriage in response to the influence of said spring to move said wheel from a position for engagement with one slide member into a position for engagement with another slide member adjacent thereto.

7. A measuring device according to claim 1 further comprising a hood member disposed intermediate said eyepiece and said window for excluding stray light from the optical path between said eyepiece and said window.

8. A measuring device according to claim 7, in which said hood extends from said window and has an aperture spaced from said window formed therein and wherein said eyepiece includes said aperture.

9. A measuring device according to claim 1 wherein said window comprises two parallel spaced sheets of flat transparent material and wherein said index portions of said slide members are movable intermediate said spaced sheets.

References Cited in the file of this patent

UNITED STATES PATENTS

| Number | Name | Date |
| --- | --- | --- |
| 966,871 | Teehan | Aug. 9, 1910 |
| 2,424,619 | Keepers | July 29, 1947 |